(12) United States Patent  
Kitajima

(10) Patent No.: US 8,116,212 B2  
(45) Date of Patent: Feb. 14, 2012

(54) LINE STATUS MONITORING CIRCUIT, NODE, COMMUNICATION SYSTEM, AND FAILURE OCCURRENCE DETERMINING METHOD

(75) Inventor: Katsuya Kitajima, Tokyo (JP)

(73) Assignee: NEC Corporation, Tokyo (JP)

( * ) Notice: Subject to any disclaimer, the term of this patent is extended or adjusted under 35 U.S.C. 154(b) by 56 days.

(21) Appl. No.: 12/397,032

(22) Filed: Mar. 3, 2009

(65) Prior Publication Data

US 2009/0225653 A1    Sep. 10, 2009

(30) Foreign Application Priority Data

Mar. 4, 2008 (JP) ................................. 2008-054153

(51) Int. Cl.  
*H04L 1/00* (2006.01)

(52) U.S. Cl. .......................... 370/244; 370/242; 370/400

(58) Field of Classification Search .................... None  
See application file for complete search history.

(56) References Cited

U.S. PATENT DOCUMENTS

| | | | | |
|---|---|---|---|---|
| 7,768,928 B2 * | 8/2010 | Harel et al. | ................. | 370/241.1 |
| 2006/0198315 A1 * | 9/2006 | Sasagawa et al. | ............. | 370/244 |
| 2006/0227704 A1 * | 10/2006 | Nakagawa et al. | ........... | 370/217 |
| 2006/0285501 A1 * | 12/2006 | Damm | ........................... | 370/252 |
| 2008/0232261 A1 * | 9/2008 | Tsuzaki et al. | ................. | 370/250 |
| 2009/0109837 A1 * | 4/2009 | Kini et al. | ...................... | 370/216 |
| 2009/0116395 A1 * | 5/2009 | Sasaki et al. | ................... | 370/245 |
| 2009/0154364 A1 * | 6/2009 | Felkar et al. | .................. | 370/245 |
| 2009/0168783 A1 * | 7/2009 | Mohan et al. | ............... | 370/395.5 |
| 2009/0213745 A1 * | 8/2009 | Yoshida | ......................... | 370/252 |
| 2009/0310483 A1 * | 12/2009 | Okazaki | ........................ | 370/228 |

FOREIGN PATENT DOCUMENTS

| JP | 3730824 B | 1/2006 |
|---|---|---|
| JP | 2006262291 A | 9/2006 |

* cited by examiner

*Primary Examiner* — Donald Mills

(57) ABSTRACT

A line status monitoring circuit receives a frame through one of a number of lines from another node connected through a redundant transmission channel which is made redundant by the lines. The line status monitoring circuit includes a line-specific check frame monitoring unit. If a line-specific check frame having an added dedicated header corresponding to each of the plurality of lines is received through one of the lines from another node, the line-specific check frame monitoring unit determines whether or not a further line-specific check frame corresponding to a frame for checking which is identical to a frame for checking to which the line-specific check frame corresponds is received through at least a predetermined number of lines within a predetermined time. If the further line-specific check frame is not received in this manner, the line-specific check frame monitoring unit discards the frame.

13 Claims, 12 Drawing Sheets

F I G. 9
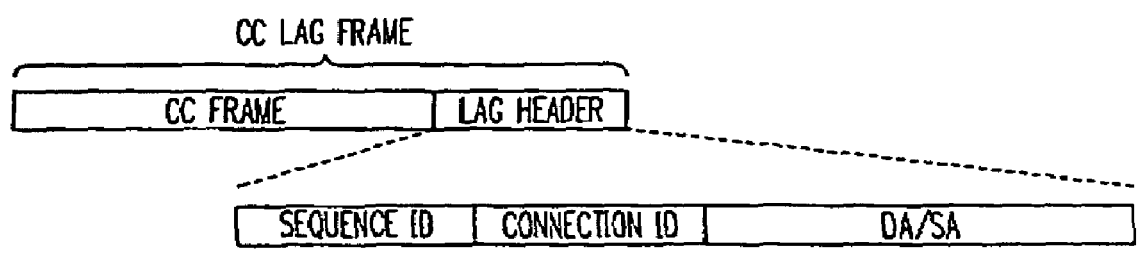

LINE STATUS MONITORING CIRCUIT, NODE, COMMUNICATION SYSTEM, AND FAILURE OCCURRENCE DETERMINING METHOD

This application is based upon and claims the benefit of priority from Japanese patent application No. 2008-054153, filed on Mar. 4, 2008, the disclosure of which is incorporated herein in its entirety by reference.

BACKGROUND OF THE INVENTION

1. Field of the Invention

The present invention relates to a line status monitoring circuit, a node, a communication system, and a failure occurrence determining method which monitor occurrence of failure in a redundant part of a network.

2. Description of the Related Art

A communication system including a redundant part as shown in FIG. 1 is disclosed in Japanese Patent No. 3730824 and Japanese Patent Laid Open Publication No. 2006-262291.

FIG. 2 shows one example of a communication system including a redundant part as in the above patent documents. A case will be described in which CC (Continuity Check) is performed by Ethernet (R) OAM (Operations Administration Maintenance) in the shown communication system. CC (Continuity Check) refers to processing to send a frame for checking (CC frame) from one end to the other end of a group of switches which is a target of administration and maintenance in order to check connection. CC frames are sent from a node 11 to a node 14 as a multicast frame as well as from the node 14 to the node 11 as a multicast frame. Between a node 12 and a node 13, a plurality of physical lines are vertically bundled and form a Link Aggregation, and a physical connection (line) which is a path of a frame is determined based on an algorithm defined by a frame distribution circuit.

In this communication system, when abnormality occurs in some of lines between the node 12 and the node 13, a connection destination search is performed again in the frame distribution circuit by the Link Aggregation function and a connection destination is changed, so that a CC frame of Ethernet OAM is sent from a sending side to a receiving side through a line having no abnormality.

SUMMARY OF THE INVENTION

In the case of simple connectivity between nodes A, B, C, D, checking by operation as described above has no problem.

However, in the communication system as described in the above patent documents, since the line A having Ethernet OAM therethrough is not abnormal even if the line B and the line C are abnormal as shown in FIG. 3, abnormalities occurring in the line B and the line C cannot be detected by the Ethernet OAM.

Further, when the line A is abnormal, a connection destination search is performed again in the frame distribution circuit by the Link Aggregation function and a connection destination is changed as shown in FIG. 4, so that a CC frame of Ethernet OAM is passed from the sending side to the receiving side. Therefore, the abnormality occurring in the line A cannot be detected on the Ethernet OAM.

As described above, operation of CC using the Ethernet OAM has a problem that when a part of a Link Aggregation section between nodes is abnormal, the abnormality cannot be detected.

The present invention is made in view of the above problem, and an exemplary object of the invention is to provide a line status monitoring circuit, a node, a communication system, and a failure occurrence determining method which can detect occurrence of a failure in some of redundant lines between nodes.

To achieve the above described exemplary object, a first exemplary aspect in accordance with the present invention provides a line status monitoring circuit which receives a frame through one of a plurality of lines from another node connected through a redundant transmission channel which is made redundant by the plurality of lines, the line status monitoring circuit including: determining means for, if a line-specific check frame having an added dedicated header corresponding to each of the plurality of lines is received from the another node through one of the plurality of lines, determining whether or not a further line-specific check frame corresponding to a frame for checking which is identical to a frame for checking which the line-specific check frame corresponds to is received through a predetermined number or more of lines within a predetermined time; and frame discarding means for, if the further line-specific check frame is not received through the predetermined number or more of lines within the predetermined time, discarding the frame for checking corresponding to the first received line-specific check frame.

In addition, to achieve the above described exemplary object, a second exemplary aspect in accordance with the present invention provides a node including the line status monitoring circuit of the first exemplary aspect of the present invention.

In addition, to achieve the above described exemplary object, a third exemplary aspect in accordance with the present invention provides a communication system in which a second node receives a frame through one of a plurality of lines from a first node connected through a redundant transmission channel which is made redundant by the plurality of lines, the first node including: generating means for, when a frame for checking to be output to the second node is received, generating a line-specific check frame by adding a dedicated header corresponding to each of the plurality of lines to the received frame for checking; and sending means for sending the generated line-specific check frame to the second node through all of the plurality of lines, the second node including: determining means for, if the line-specific check frame is received from the first node through one of the plurality of lines, determining whether or not a further line-specific check frame corresponding to a frame for checking which is identical to a frame for checking which the line-specific check frame corresponds to is received through a predetermined number or more of lines within a predetermined time; and frame discarding means for, if the further line-specific check frame is not received through the predetermined number or more of lines within the predetermined time, discarding the frame for checking corresponding to the first received line-specific check frame.

In addition, to achieve the above described exemplary object, a fourth exemplary aspect in accordance with the present invention provides a failure occurrence determining method including the steps of: if a line-specific check frame having an added dedicated header corresponding to each of a plurality of lines is received through one of the plurality of lines from another node connected through a redundant transmission channel which is made redundant by the plurality of lines, determining whether or not a further line-specific check frame corresponding to a frame for checking which is identical to a frame for checking which the line-specific check frame corresponds to is received through a predetermined number or more of lines within a predetermined time; and if the further line-specific check frame is not received through the predetermined number or more of lines within the predetermined time, discarding the frame for checking corresponding to the first received line-specific check frame.

BRIEF DESCRIPTION OF THE DRAWINGS

The exemplary objects and features of the present invention will become more apparent from the consideration of the following detailed description taken in conjunction with the accompanying drawings, in which:

FIG. 9 is a diagram showing a configuration of a LAG header included in a CC LAG frame;

DESCRIPTION OF THE EXEMPLARY EMBODIMENT

Figure 1:
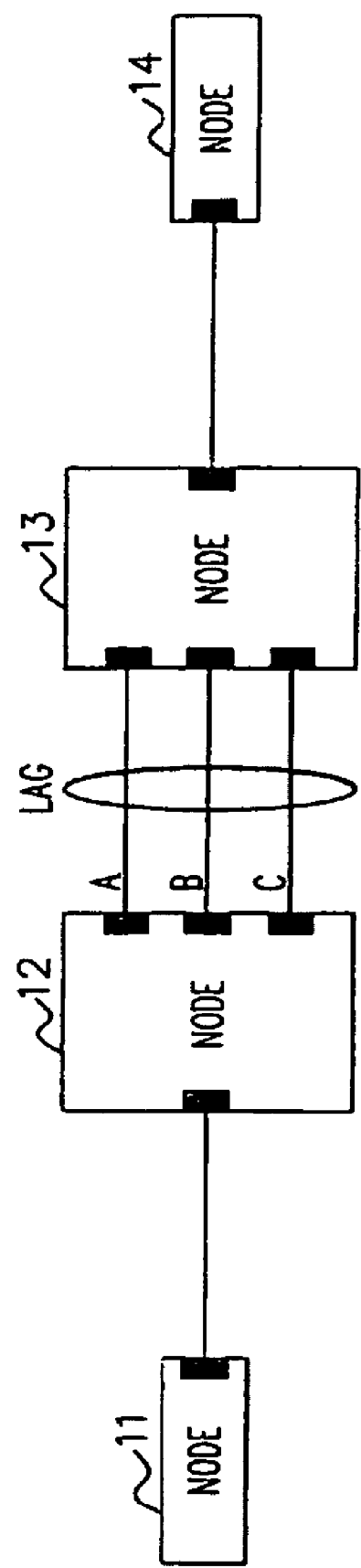
FIG. 1 is a diagram showing a configuration of a communication system including a redundant part.
Figure 2:
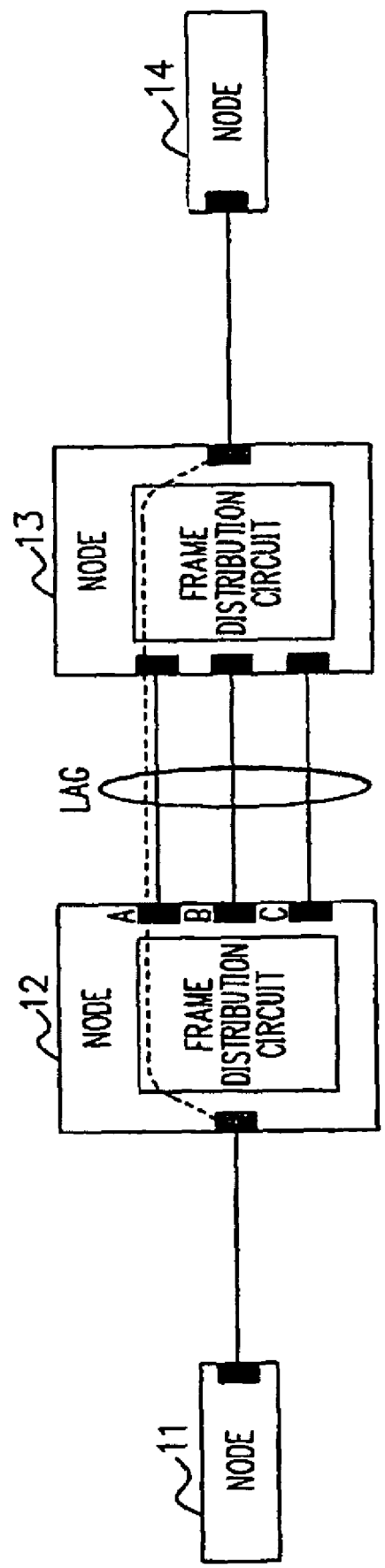
FIG. 2 is a diagram showing a configuration of a communication system including a redundant part.
Figure 3:
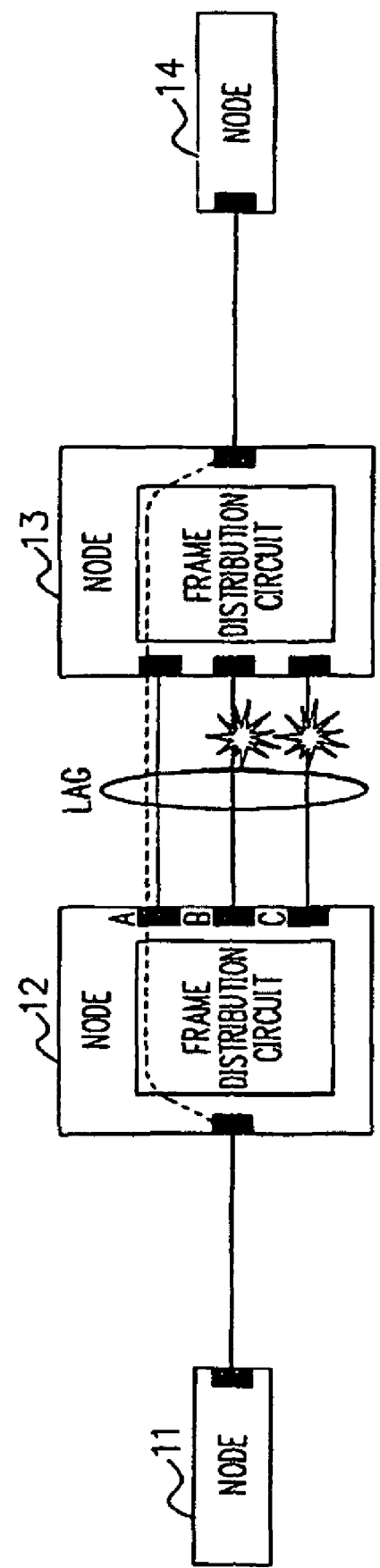
FIG. 3 is a diagram showing a state where failure occurs in some of lines in the communication system including the redundant part.
Figure 4:
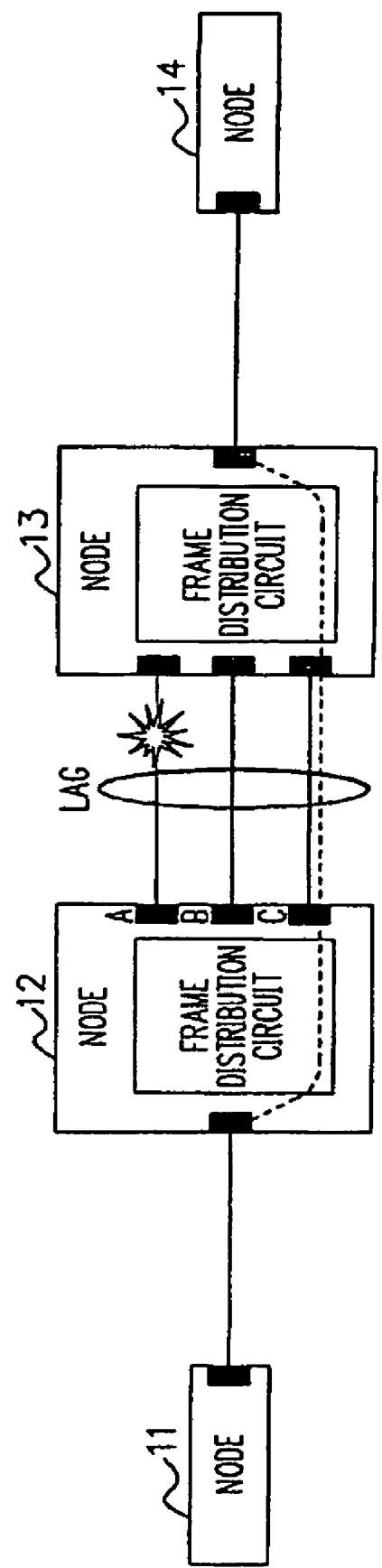
FIG. 4 is a diagram showing a state where failure occurs in some of lines in the communication system including the redundant part.
Figure 5:
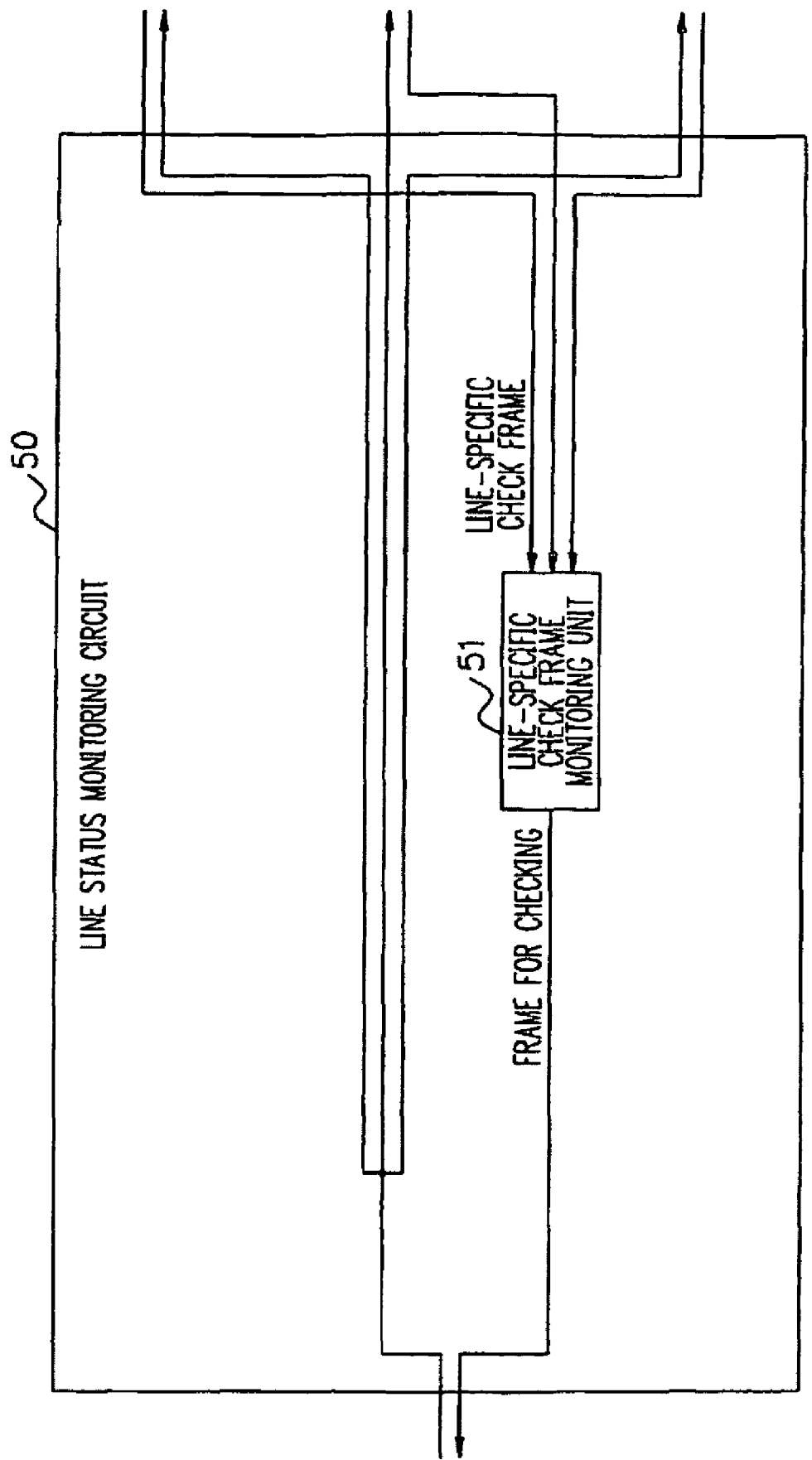
FIG. 5 is a diagram showing a configuration of a line status monitoring circuit according to the present invention.

As shown in FIG. 5, a line status monitoring circuit 50 according to the present invention is a line status monitoring circuit which receives a frame through one of a plurality of lines from a node connected through a redundant transmission channel which is made redundant by the plurality of lines. The line status monitoring circuit 50 includes a line-specific check frame monitoring unit 51. If a line-specific check frame having an added dedicated header corresponding to each of the plurality of lines is received through one of the plurality of lines from the node connected through the redundant transmission channel, the line-specific check frame monitoring unit 51 determines whether or not a line-specific check frame corresponding to a frame for checking included in the line-specific check frame is received through a predetermined number or more of lines within a predetermined time from reception of a first line-specific check frame. Then, if the line-specific check frame corresponding to the frame for checking included in the first received line-specific check frame is not received through the predetermined number or more of lines within the predetermined time from reception of the first line-specific check frame, the line-specific check frame monitoring unit 51 discards the frame for checking included in the first received line-specific check frame.

Figure 6:
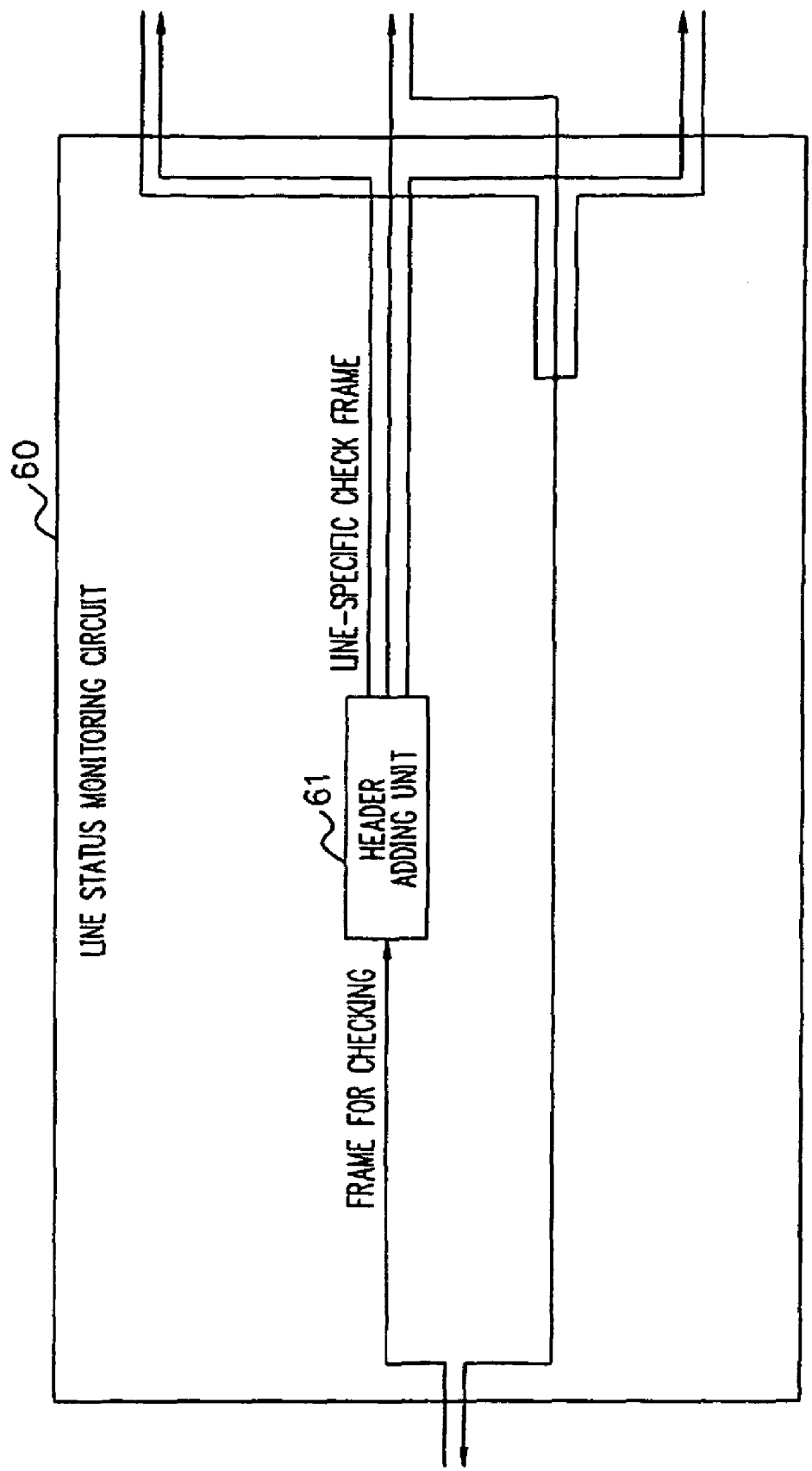
FIG. 6 is a diagram showing a configuration of a line status monitoring circuit according to the present invention.

As shown in FIG. 6, a line status monitoring circuit 60 according to the present invention is a line status monitoring circuit which determines a line to be used from among a plurality of lines when a frame for checking of OAM is output to a node connected through a redundant transmission channel which is made redundant by the plurality of line. The line status monitoring circuit 60 includes a header adding unit 61. When the frame for checking to be output to the node connected through the redundant transmission channel is received, the header adding unit 61 generates a line-specific check frame by adding a dedicated header corresponding to each of the redundant plurality of lines to the received frame for checking. Then, the header adding unit 61 sends the generated line-specific check frame through all of the plurality of redundant lines to the node connected through the redundant transmission channel.

As described above, a dedicated header corresponding to each of a plurality of redundant lines is added to a frame for checking addressed to a node connected through a redundant transmission channel which is made redundant by the plurality of lines, and the frame for checking having the added dedicated header is transmitted as a line-specific check frame. Thereby, a receiving side which receives the frame for checking can detect occurrence of a failure in some of redundant lines between nodes.

Hereinafter, exemplary embodiments of the present invention will be described.

First Exemplary Embodiment

Figure 7:
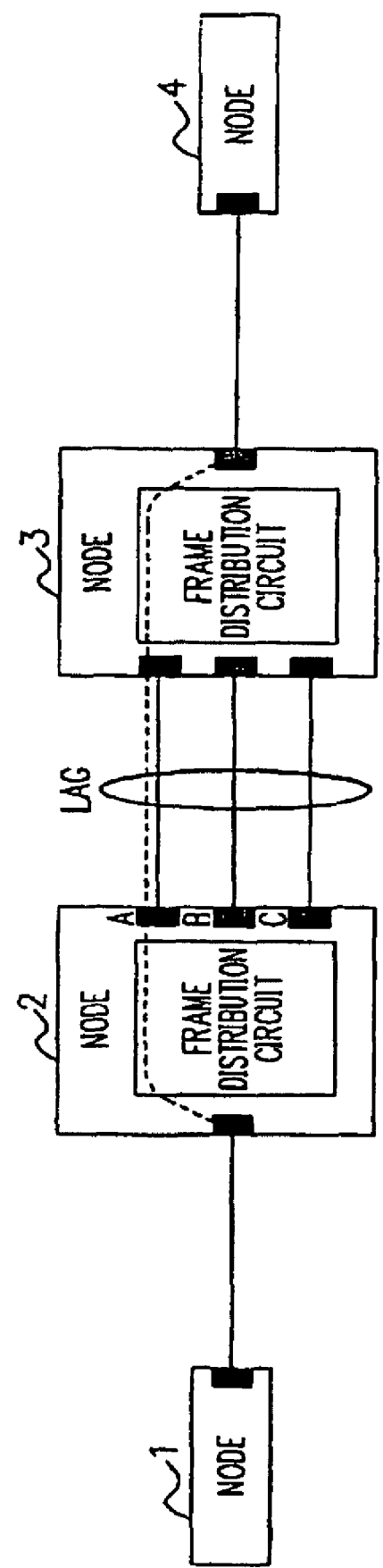
FIG. 7 is a diagram showing a configuration of a communication system according to a first exemplary embodiment of the present invention.

FIG. 7 shows a configuration of a communication system according to the exemplary embodiment. This communication system includes four nodes 1 to 4, and Link Aggregation is formed for redundancy between nodes 2 and 3. As sections managed by Ethernet OAM, sections between the nodes 1, 2, 3, 4 are assumed. The Ethernet OAM defined in ITU-T Y.1731 is assumed to be used here. MEPs (Maintenance End Points) are set in the nodes 1 and 4 which are ends of the Ethernet OAM. The section between the nodes 2 and 3 is made redundant by the Link Aggregation, and three physical interfaces (lines A, B, C) are connected between the nodes 2 and 3. By an algorithm defined by a frame distribution circuit, a physical connection which is a path of a frame is determined between the nodes 2 and 3 forming the Link Aggregation.

CC frames are sent from the node 1 to the node 4 as a multicast frame as well as from the node 4 to the node 1 as a multicast frame. At the MEPs at the both ends, abnormalities are monitored by reception of CC frames from opposed ends, respectively.

Figure 8:
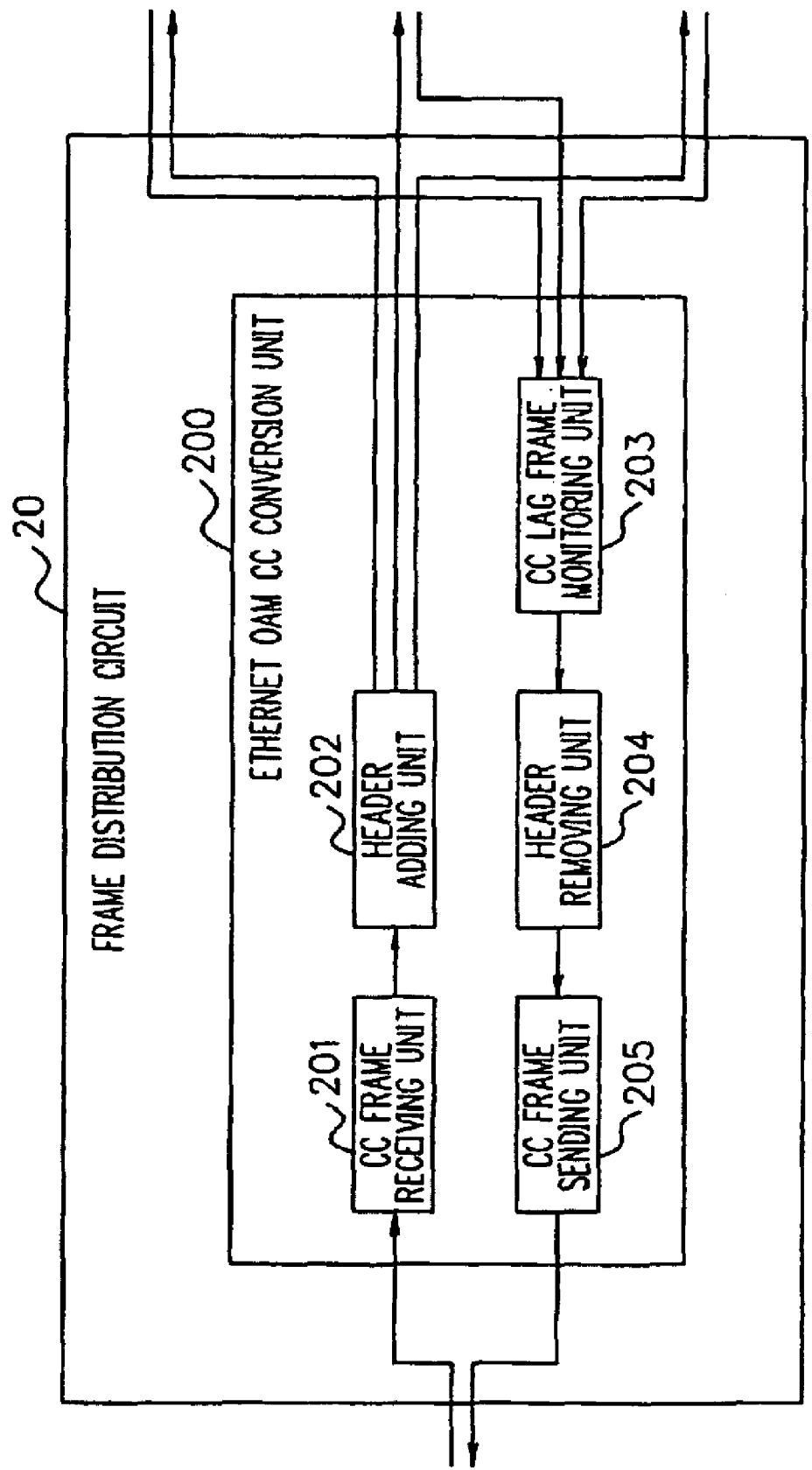
FIG. 8 is a diagram showing a configuration of a frame distribution circuit according to the first exemplary embodiment.

The nodes 2, 3 include frame distribution circuits 20, 30 including Ethernet OAM CC conversion units 200, 300, respectively. Because the Ethernet OAM CC conversion units 200, 300 have a similar configuration, only the Ethernet OAM CC conversion unit 200 will be described by way of example. As shown in FIG. 8, the Ethernet OAM CC conversion unit 200 includes a CC frame receiving unit 201, a header adding unit 202, a CC LAG frame monitoring unit 203, a header removing unit 204, and a CC frame sending unit 205.

The CC frame receiving unit 201 receives a CC frame from a node on a non-redundant line side. The header adding unit 202 adds a specific header to the CC frame received by the CC frame receiving unit 201 and then outputs the CC frame to a downstream node on a redundant side through each of redundant lines. The CC LAG frame monitoring unit 203 monitors a CC LAG frame (a CC frame to which a dedicated header (LAG header) is added) which is sent through each of redundant lines on the redundant side. The header removing unit 204 removes the LAG header from the CC LAG frame. The CC frame sending unit 205 outputs the CC frame from which the LAG header is removed, to the node on the non-redundant line side.

As shown in FIG. 9, a LAG header which is added to a CC frame of the Ethernet OAM includes source and destination addresses (SA(Source Address)/DA(Destination Address)) composed of dedicated MAC addresses, a sequence ID, and a connection ID. The SA/DA is used for the CC LAG frame monitoring unit 203 to recognize that the CC frame is a frame addressed to the self node. The sequence ID is used for the CC LAG frame monitoring unit 203 to determine identity and continuity of a CC LAG frame from each circuit. The connection ID is used for the CC LAG frame monitoring unit 203 to determine through which line a CC LAG frame is sent.

As a MAC address of DA/SA, a dedicated MAC address is defined and used. As for a sequence ID, sequence numbers which are identical with respect to one CC frame are added to respective CC LAG frames. As for a connection ID, numbers different for each physical port are added to respective ports to distinguish the ports.

When a CC frame from the node on the non-redundant line side is received by the frame distribution circuit 20, the header adding unit 202 generates a CC LAG frame by adding a LAG header to the CC frame. The frame distribution circuit 20 sends the CC LAG frame to each of lines (A, B, C) forming the Link Aggregation.

On the other hand, a CC LAG frame sent from the node on the redundant side through the lines A, B, C is received by the CC LAG frame monitoring unit 203. From the time point when a CC LAG frame including a certain sequence ID is first received, the CC LAG frame monitoring unit 203 monitors whether or not CC LAG frames including all connection IDs with respect to the certain sequence ID are received within a predetermined time. Specifically, if a connection ID of a first received CC LAG frame among CC LAG frames including sequence ID "1" is "A", the CC LAG frame monitoring unit 203 monitors whether or not a CC LAG frame having sequence ID "1" and connection ID "B" and a CC LAG frame having sequence ID "1" and connection ID "C" are received within a predetermined time from reception of the first CC LAG frame. If CC LAG frames corresponding to all the connection IDs are received within the predetermined time, the header removing unit 204 removes the LAG header. Then, the CC frame sending unit 205 sends the CC frame from which the LAG header is removed, to the node on the non-redundant side. If the CC LAG frames corresponding to all the connection IDs cannot be received within the predetermined time, or if a CC LAG frame having another sequence ID is received before the CC LAG frames corresponding to all the connection IDs are received, the CC LAG frame monitoring unit 203 discards the CC frame corresponding to the sequence ID.

In the example of transmission from the node 2 to node 3, when a CC frame of Ethernet OAM is received from the node 1, in the node 2 which forms the Link Aggregation, a CC LAG frame that is the CC frame to which a MAC address dedicated to the CC frame is added is generated by the Ethernet OAM CC conversion unit 200, and the generated CC LAG frame is sent to each of the lines A, B, C forming the Link Aggregation.

Figure 10:
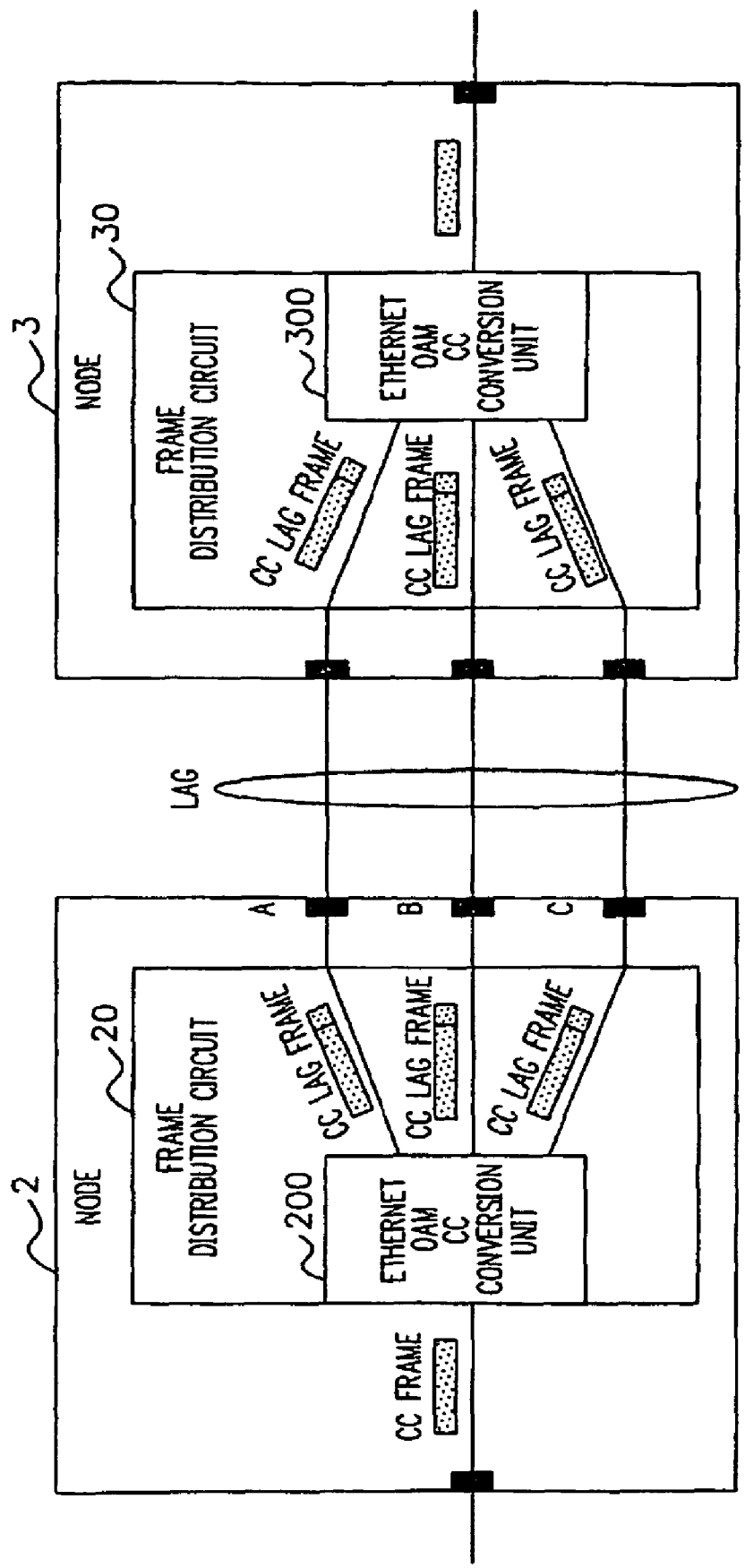
FIG. 10 is a diagram showing one example of operation of the communication system according to the first exemplary embodiment.

On the other hand, in the receiving side node 3, when the CC LAG frames are received from all of the lines forming the Link Aggregation as shown in FIG. 10, a CC frame from which the dedicated frame is removed is generated by the Ethernet OAM CC conversion unit 300, and the generated CC frame is sent to the node 4.

Figure 11:
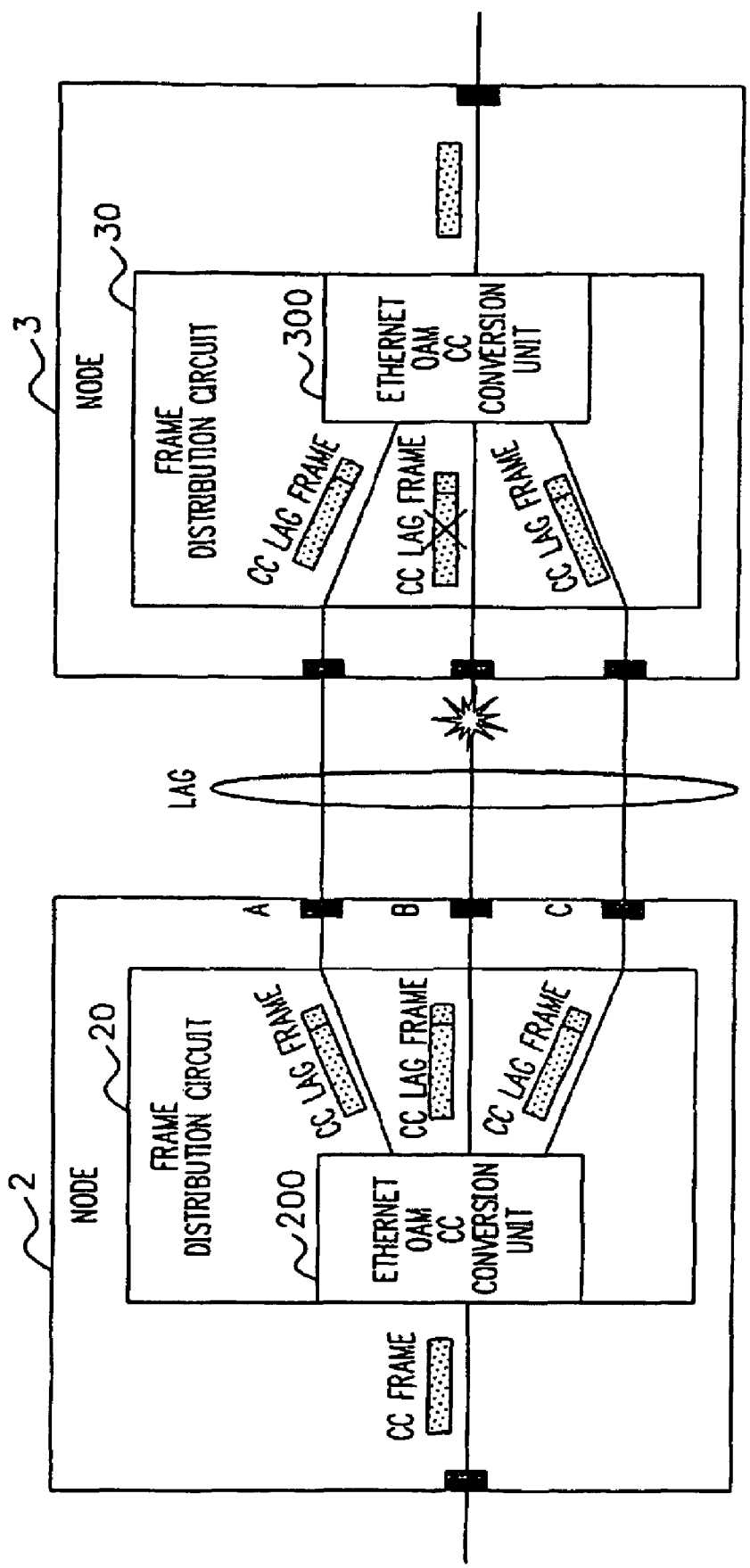
FIG. 11 is a diagram showing one example of operation of the communication system according to the first exemplary embodiment.

As shown in FIG. 11, if the CC LAG frame cannot be received through at least one of the lines, a CC frame is not sent to the node 4. Therefore, even if any of the lines A, B, C is abnormal, since a CC frame is not sent to the node 4, therefore, abnormality can be detected by the node 4.

Since the mechanism of Ethernet OAM and the CC frame are defined in ITU-T Y.1731 and well known to those skilled in the art, detailed description thereof will be omitted.

As described above, in the communication system according to the exemplary embodiment, a CC LAG frame is sent to all of physical lines made redundant by the LAG or the like in the Ethernet and arrival of them are checked, and a CC frame is then sent to a next node. Therefore, abnormality in each of the line can be detected even if the physical lines are made redundant by the LAG or the like in the Ethernet. Furthermore, at the node 1 and the node 4 which are not adjacent to the LAG section, communication can be performed in just the same manner as in the scheme of the usual Ethernet.

(1) Since a CC LAG frame is sent to all physical ports of the Link Aggregation, connection statuses of all the physical ports can be checked.

(2) Since the mechanism of the existing Ethernet OAM is used, the existing mechanism can be used end-to-end if the present invention is applied to only a LAG section.

(3) Since a CC LAG frame is actually sent to all of physical ports, the present invention can be applied even if another redundancy scheme is used instead of the Link Aggregation.

Second Exemplary Embodiment

A second exemplary embodiment of the present invention will be described.

Figure 12:
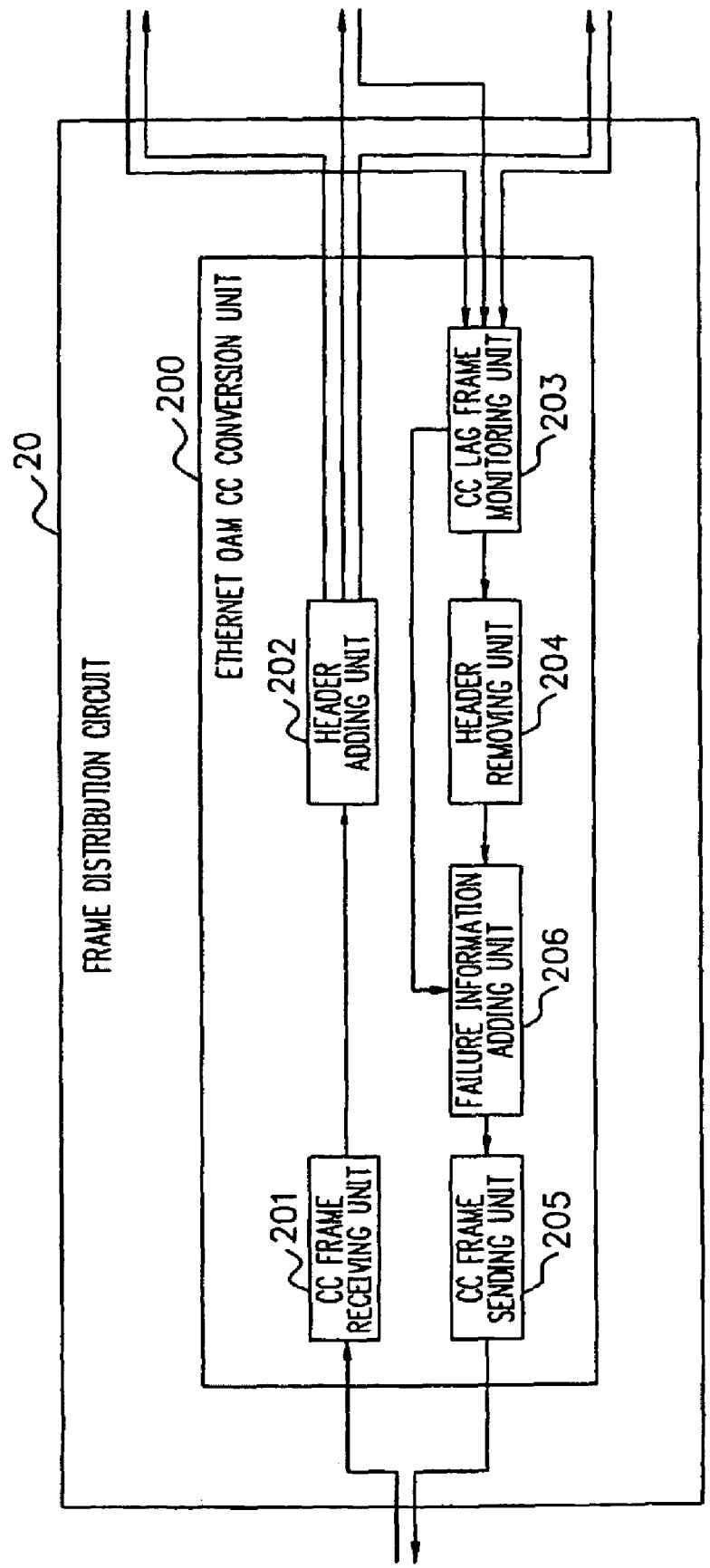
FIG. 12 is a diagram showing a configuration of a frame distribution circuit according to a second exemplary embodiment of the present invention.

FIG. 12 shows a configuration of the frame distribution circuit 20 according to the exemplary embodiment. Although this configuration is mostly the same as in the first exemplary embodiment, it further includes a failure information adding unit 206. The failure information adding unit 206 adds failure information provided as a notification from the CC LAG frame monitoring unit 203, to a CC frame.

In the exemplary embodiment, if CC LAG frames corresponding to all connection IDs cannot be received within a predetermined time or even if a CC LAG frame having another sequence ID is received before the CC LAG frames corresponding to all the connection IDs are received, the CC LAG frame monitoring unit 203 does not discard a CC frame corresponding to a relevant sequence ID. Instead, the CC LAG frame monitoring unit 203 outputs information about an unreceived CC LAG frame to the failure information adding unit 206 as failure information. The information output as failure information is information corresponding to a connection ID, SA/DA, and the like included in the LAG header of the unreceived CC LAG frame.

A downstream node which receives a CC frame to which failure information is added by the failure information adding unit 206 can recognize in which line a failure has occurred between the nodes 2 and 3.

Since the second exemplary embodiment is the same as the first exemplary embodiment in other respects, duplicate description will be omitted.

Various modifications can be made to the present invention.

For example, while a CC frame is not sent to the node 4 if CC LAG frames cannot be received through at least one of the lines in the above described exemplary embodiments, the CC frame may be sent to the node 4 when a predetermined threshold number or more of CC LAG frames are received.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A line status monitoring circuit for a first node which receives a frame through one of a plurality of lines from a second node connected through a redundant transmission channel which is made redundant by the plurality of lines, the line status monitoring circuit comprising:
a determining unit which, if a line-specific check frame having an added dedicated header corresponding to each of the plurality of lines is received from the second node through one of the plurality of lines, determines whether or not a further line-specific check frame corresponding to a frame for checking which is identical to a frame for checking included in the received line-specific check frame is received through a predetermined number or more of lines within a predetermined time; and
a frame discarding unit which, if the further line-specific check frame is not received through the predetermined number or more of lines within the predetermined time, discards the frame for checking corresponding to the first received line-specific check frame,
wherein a connection status of each of a plurality of physical ports corresponding to the plurality of lines is checked, wherein the line-specific check frame is a LAG frame, and wherein the LAG frame is sent to each physical port.

2. The line status monitoring circuit according to claim 1, comprising, instead of the frame discarding unit, a failure information adding unit which, if the further line-specific check frame is not received through the predetermined number or more of lines within the predetermined time from reception of the first line-specific check frame, adds information which identifies a line through which the further line-specific check frame could not be received, to the frame for checking.

3. The line status monitoring circuit according to claim 1, comprising:
a generating unit which, when a frame for checking to be output to the second node is received, generates the line-specific check frame by adding the dedicated header to the received frame for checking; and
a sending unit which sends the generated line-specific check frame to the second node through all of the plurality of lines.

4. A line status monitoring circuit for a first node which determines a line to be used from among a plurality of lines when a frame for checking of OAM is output to a second node connected through a redundant transmission channel which is made redundant by the plurality of lines, the line status monitoring circuit comprising:
a generating unit which, when the frame for checking to be output to the second node is received, generates a line-specific check frame by adding a dedicated header corresponding to each of the redundant plurality of lines to the received frame for checking; and
a sending unit which sends the generated line-specific check frame to the second node through all of the plurality of redundant lines,
wherein a connection status of each of a plurality of physical ports corresponding to the plurality of lines is checked, wherein the line-specific check frame is a LAG frame, and wherein the LAG frame is sent to each physical port.

5. The line status monitoring circuit according to claim 1, wherein the dedicated header comprises source/destination information including addresses of the first node and the second node, and information which identifies a line to be used for transmission of a self frame.

6. The line status monitoring circuit according to claim 5, wherein the source/destination information is composed of MAC addresses of the first node and the second node.

7. A node comprising the line status monitoring circuit of claim 1.

8. A communication system in which a second node receives a frame through one of a plurality of lines from a first node connected through a redundant transmission channel which is made redundant by the plurality of lines,
the first node comprising:
a generating unit which, when a frame for checking to be output to the second node is received, generates a line-specific check frame by adding a dedicated header corresponding to each of the plurality of lines to the received frame for checking; and
a sending unit which sends the generated line-specific check frame to the second node through all of the plurality of lines,
the second node comprising:
a determining unit which, if the line-specific check frame is received from the first node through one of the plurality of lines, determines whether or not a further line-specific check frame corresponding to a frame for checking included in the received line-specific check frame is received through a predetermined number or more of lines within a predetermined time; and
a frame discarding unit which, if the further line-specific check frame is not received through the predetermined number or more of lines within the predetermined time, discards the frame for checking corresponding to the first received line-specific check frame,
wherein a connection status of each of a plurality of physical ports corresponding to the plurality of lines is checked, wherein the line-specific check frame is a LAG frame, and wherein the LAG frame is sent to each physical port.

9. The communication system according to claim 8, wherein the second node comprises, instead of the frame discarding unit, a failure information adding unit which, if the further line-specific check frame is not received through the predetermined number or more of lines within the predetermined time from reception of the first line-specific check frame, adds information which identifies a line through which the further line-specific check frame could not be received, to the frame for checking.

10. A failure occurrence determining method performed in relation to a first node and comprising the steps of:
if a line-specific check frame having an added dedicated header corresponding to each of a plurality of lines is received through one of the plurality of lines from a second node connected through a redundant transmission channel which is made redundant by the plurality of lines, determining whether or not a further line-specific check frame corresponding to a frame for checking included in the received line-specific check frame is received through a predetermined number or more of lines within a predetermined time; and if the further line-specific check frame is not received through the predetermined number or more of lines within the predetermined time, discarding the frame for checking corresponding to the first received line-specific check frame, wherein a connection status of each of a plurality of physical ports corresponding to the plurality of lines is checked, wherein the line-specific check frame is a LAG frame, and wherein the LAG frame is sent to each physical port.

11. A line status monitoring circuit for a first node which receives a frame through one of a plurality of lines from a second node connected through a redundant transmission channel which is made redundant by the plurality of lines, the line status monitoring circuit comprising:

determining means for, if a line-specific check frame having an added dedicated header corresponding to each of the plurality of lines is received from the second node through one of the plurality of lines, determining whether or not a further line-specific check frame corresponding to a frame for checking included in the received line-specific check frame is received through a predetermined number or more of lines within a predetermined time; and frame discarding means for, if the further line-specific check frame is not received through the predetermined number or more of lines within the predetermined time, discarding the frame for checking corresponding to the first received line-specific check frame, wherein a connection status of each of a plurality of physical ports corresponding to the plurality of lines is checked, wherein the line-specific check frame is a LAG frame, and wherein the LAG frame is sent to each physical port.

12. A line status monitoring circuit for a first node which determines a line to be used from among a plurality of lines when a frame for checking of OAM is output to a second node connected through a redundant transmission channel which is made redundant by the plurality of lines, the line status monitoring circuit comprising:

generating means for, when the frame for checking to be output to the second node is received, generating a line-specific check frame by adding a dedicated header corresponding to each of the redundant plurality of lines to the received frame for checking; and sending means for sending the generated line-specific check frame to the second node through all of the plurality of redundant lines, wherein a connection status of each of a plurality of physical ports corresponding to the plurality of lines is checked, wherein the line-specific check frame is a LAG frame, and wherein the LAG frame is sent to each physical port.

13. A communication system in which a second node receives a frame through one of a plurality of lines from a first node connected through a redundant transmission channel which is made redundant by the plurality of lines, the first node comprising:

generating means for, when a frame for checking to be output to the second node is received, generating a line-specific check frame by adding a dedicated header corresponding to each of the plurality of lines to the received frame for checking; and sending means for sending the generated line-specific check frame to the second node through all of the plurality of lines, the second node comprising:

determining means for, if the line-specific check frame is received from the first node through one of the plurality of lines, determining whether or not a further line-specific check frame corresponding to a frame for checking included in the received line-specific check frame is received through a predetermined number or more of lines within a predetermined time; and frame discarding means for, if the further line-specific check frame is not received through the predetermined number or more of lines within the predetermined time, discarding the frame for checking corresponding to the first received line-specific check frame, wherein a connection status of each of a plurality of physical ports corresponding to the plurality of lines is checked, wherein the line-specific check frame is a LAG frame, and wherein the LAG frame is sent to each physical port.

* * * * *